(12) United States Patent
Zhou et al.

(10) Patent No.: US 8,879,616 B2
(45) Date of Patent: Nov. 4, 2014

(54) RECEIVER WITH DECISION FEEDBACK EQUALIZER

(75) Inventors: Dacheng Zhou, Fort Collins, CO (US); Daniel Alan Berkram, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 13/285,195

(22) Filed: Oct. 31, 2011

(65) Prior Publication Data

US 2013/0107935 A1 May 2, 2013

(51) Int. Cl.
*H03H 7/30* (2006.01)
*H04L 25/03* (2006.01)

(52) U.S. Cl.
CPC .... *H04L 25/03063* (2013.01); *H04L 25/03248* (2013.01)
USPC .......................................... 375/229; 375/316

(58) Field of Classification Search
CPC ................ H04I 25/03057; H04I 2025/03636; H04I 25/03343; H04I 2025/03745; H04I 25/03146; H04L 25/03885
USPC .................................. 375/229–233, 316, 340
See application file for complete search history.

(56) References Cited

U.S. PATENT DOCUMENTS

| | | | |
|---|---|---|---|
| 7,522,847 B2 | 4/2009 | Momtaz et al. | |
| 7,526,022 B2 | 4/2009 | Nieto | |
| 7,539,243 B1 * | 5/2009 | Toifl et al. | 375/229 |
| 7,606,301 B2 | 10/2009 | Aziz | |
| 7,782,932 B2 * | 8/2010 | Payne et al. | 375/224 |
| 7,792,186 B2 | 9/2010 | Agazzi et al. | |
| 7,792,187 B2 | 9/2010 | Bulzacchelli | |
| 2005/0259774 A1 * | 11/2005 | Garlepp | 375/355 |
| 2005/0265440 A1 * | 12/2005 | Sohn | 375/233 |
| 2006/0158225 A1 * | 7/2006 | Stojanovic et al. | 326/87 |
| 2008/0057900 A1 * | 3/2008 | Fang et al. | 455/296 |
| 2008/0198916 A1 | 8/2008 | Zeng et al. | |
| 2009/0175328 A1 * | 7/2009 | Kim et al. | 375/233 |
| 2009/0310665 A1 * | 12/2009 | Agazzi et al. | 375/229 |
| 2010/0020861 A1 | 1/2010 | Leibowitz et al. | |
| 2010/0046683 A1 | 2/2010 | Beukema et al. | |
| 2010/0135378 A1 * | 6/2010 | Lin et al. | 375/233 |
| 2010/0238993 A1 * | 9/2010 | Huang et al. | 375/233 |
| 2010/0310024 A1 * | 12/2010 | Agazzi et al. | 375/346 |
| 2011/0090947 A1 * | 4/2011 | Peng et al. | 375/233 |
| 2011/0222594 A1 * | 9/2011 | Zerbe et al. | 375/233 |
| 2011/0286511 A1 * | 11/2011 | Zeng et al. | 375/233 |
| 2012/0002713 A1 * | 1/2012 | Telang et al. | 375/233 |
| 2012/0128055 A1 * | 5/2012 | Jiang | 375/233 |
| 2012/0140812 A1 * | 6/2012 | Ho et al. | 375/233 |
| 2012/0155529 A1 * | 6/2012 | Mangaser et al. | 375/233 |
| 2013/0156087 A1 * | 6/2013 | Erba et al. | 375/233 |
| 2014/0161166 A1 * | 6/2014 | Ho et al. | 375/224 |

* cited by examiner

*Primary Examiner* — Emmanuel Bayard

(57) ABSTRACT

A receiver includes a front-end amplifier, a sampler, and a decision-feedback equalizer. The front-end amplifier provides for amplifying a received input signal to yield an amplified input signal. The sampler provides for sampling the amplified input signal so as to yield a sampler output signal. The sampler output signal is a function of the amplified input signal and a reference signal coupled to a reference input of the sampler. The decision feedback equalizer provides for adjusting the reference signal as a function of feedback based at least in part on the sampler output signal.

20 Claims, 4 Drawing Sheets

RECEIVER WITH DECISION FEEDBACK EQUALIZER

BACKGROUND

Digital data can be transmitted in the form of analog pulse trains. During transmission, analog pulse trains can become degraded, e.g., afflicted with noise and distortion. For example, originally sharply defined pulses can "smear" and, thus, overlap, causing inter-symbol interference (ISI). A receiver can precisely sample a degraded pulse train to avoid errors due to ISI.

A receiver can include a front-end amplifier to amplify the received analog pulse train relative to a reference prior to sampling to increase a signal-to-noise ratio, to provide an input within a sampler's dynamic range, and to provide for fan-out for cases in which more than one sampler is used. The ability of a receiver to accurately recover the original data can be enhanced by including a decision-feedback equalizer to cancel out ISI contributions of previous bits (the values of which have been "decided") by adjusting the reference for the front-end amplifier as a function of the recent history of data "decisions" output by the sampler.

BRIEF DESCRIPTION OF THE DRAWINGS

The following figures represent examples and not the invention itself.

DETAILED DESCRIPTION

In a receiver 100, a reference input 102 of a sampler 104 is controlled in part by an equalizer signal 106 provided by a decision-feedback equalizer (DFE) 108. An equalizer signal may take some time after a transition to settle to a "valid" level. The latency required for this settling imposes a data-rate limitation on the device to which the equalizer signal is input. To exceed a data limitation, a pair of devices can be operated in parallel and out-of-phase. However, it is less costly (in terms of money, current, and other parameters) to operate samplers in parallel than to operate front-end amplifiers in parallel. Thus, receiver 100 achieves a cost benefit by applying equalizer signal 106 to sampler reference input 102 instead of to a front-end amplifier.

Figure 1:
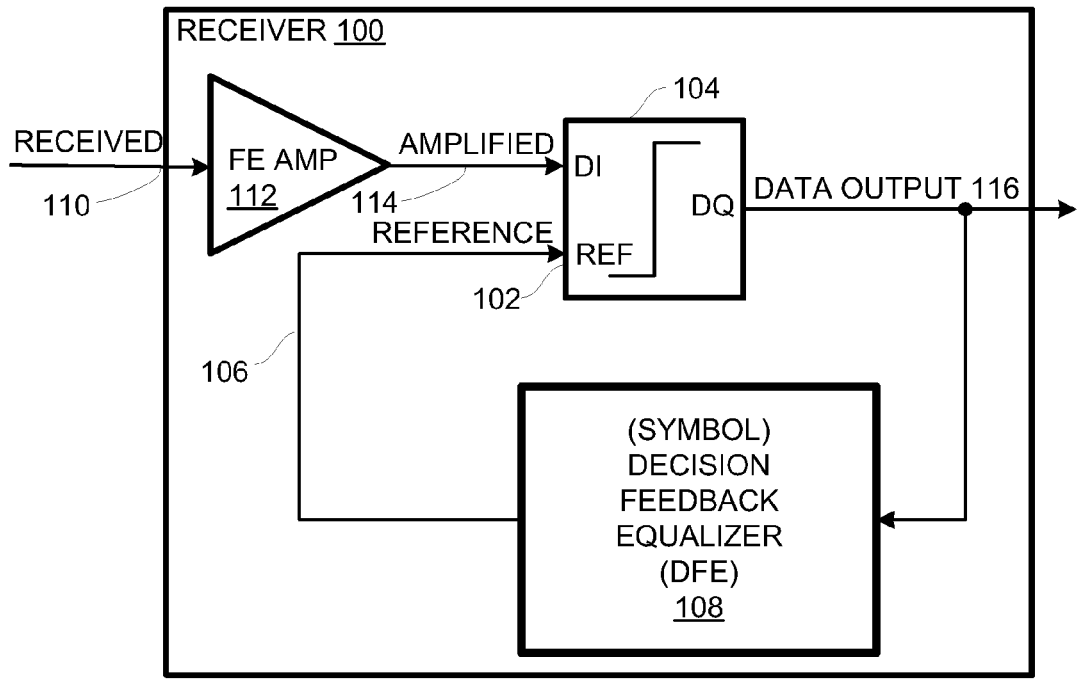
FIG. 1 is a schematic diagram of a receiver system in accordance with an example.
Figure 2:
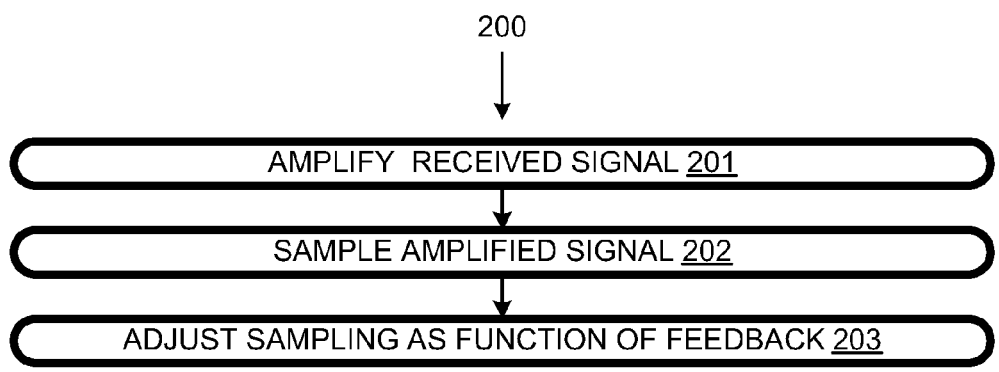
FIG. 2 is a flow chart of a receiver process in accordance with an example.
Figure 3:
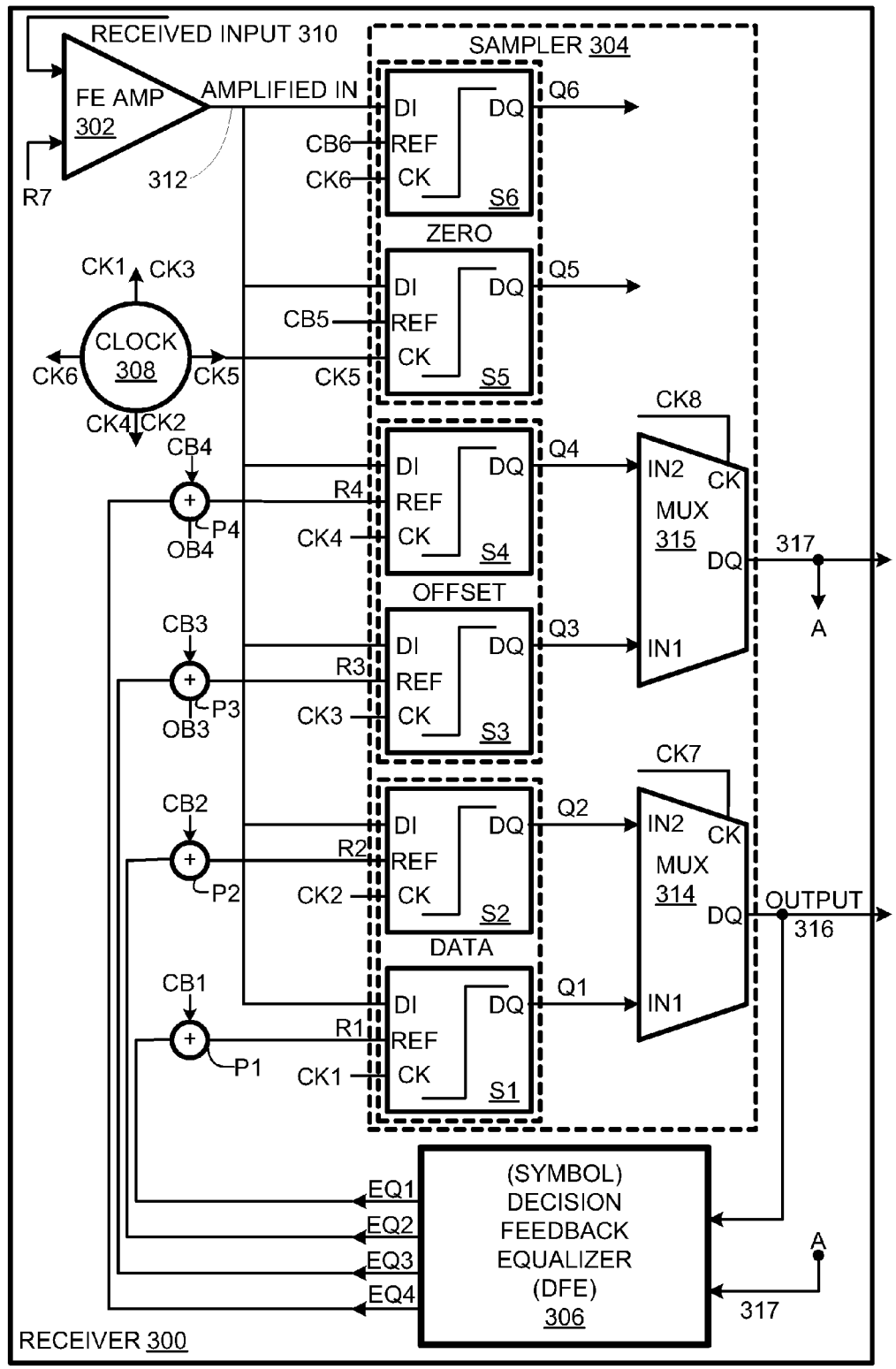
FIG. 3 is a schematic diagram of another receiver system in accordance with an example.

Receiver 100 implements a process 200, flow-charted in FIG. 2. At 201, an information-bearing "received" input signal 110 is amplified by a front-end amplifier 112 of receiver 100, yielding an amplified input signal 114. At 202, sampler 104 samples amplified input signal 114 to provide a sampler data output signal 116, which serves as the output of receiver 100 and at least ideally corresponds to the originally transmitted (non-degraded) pulse train. Sampler data output signal 116 is a function of amplified input signal 114 and a reference signal, e.g., which can be the same as or based on equalizer signal 106. At 203, the reference signal is adjusted based on feedback from sampler data output signal 116.

"Receiver", herein, refers to a device for receiving an information-bearing analog signal and for extracting or assisting in extracting the information from the information-bearing analog signal. For example, receiver 100 assists in extracting information by providing a non-degraded pulse train free of ISI. "Device" herein refers to hardware, which may be programmed, programmable, or non-programmable. A device can be a discrete element or integrated with other devices, e.g., on an integrated circuit. Herein, characterizing a device according to a function the device performs does not preclude the device from performing other functions as well.

"Signal", herein, refers to a set of at least one propagating waveform. For example, a differential signal can include a pair of complementary waveforms. An "information-bearing" signal is a signal encoded with data or other content. An information-bearing signal can, for example, represent parallel different streams of data using parallel waveforms. In such a case and in the case of a differential signal, a "parent" signal can include plural "child" signals.

"Amplifier", herein, refers to a device for changing the amplitude of a parameter, e.g., voltage relative to a reference level, of a signal. The parameter can be a number of fan-outs or copies of the input signal, even if the amplitude of an individual copy is no greater than the amplitude of the incoming signal. Herein, a "front-end" amplifier" is an amplifier that amplifies a received signal before the signal is received by a downstream device, e.g., a sampler.

"Decision-feedback equalizer" and "DFE", herein, refer to a device for generating an equalizer signal as a function of an output data signal fed back to the DFE. Typically, a DFE takes into account, not only a current data value, but a recent history of data values. For example, the last 3, 10, or other counting number of data output values can be used to generate an equalizer signal. In general, the more recent values are given more weight than older values in generating the equalizer signal. Herein, "applying" a signal can include applying a signal directly, e.g., to an input, or indirectly, e.g., after modification or combining with another signal.

Note, the foregoing definitions are intended to characterize terms in quotes, but the characterizations are not intended to be comprehensive. For example, characterizing a "cat" as an animal does not imply all animals are cats. Likewise, not all entities meeting a characterization qualify as an instance of a class being characterized. Further instances of the concepts used herein are provided in a further example.

A receiver 300 includes a front-end amplifier 302, a sampler 304, a DFE 306, and a clock 308. Front-end amplifier 302 amplifies a received information-bearing input signal 310 relative to a reference level (e.g., voltage) R7 to yield amplified input signal 312. Amplifier 302 can be a continuous-time linear equalizer (CTLE) amplifier having an analog high-pass filter to compensate for a low-pass characteristic of the communication channel along which input signal 310 is received. Other types of front-end amplifiers are used in other examples.

Parent sampler 304 includes child samplers S1-S6 and multiplexers (MUXs) 314 and 315. Samplers S1-S6 are nominally identical and receive nominally the same data inputs, e.g., fan-outs of amplified input signal 312. However, samplers S1-S6 are clocked at different phases.

Data samplers 51 and S2 are driven at or about 180° out-of-phase with respect to each other by clock signals CK1 and CK2 so that, for example, sampler 51 samples "odd" symbol periods and sampler S2 samples "even" symbol periods. The outputs Q1 and Q2 of samplers S1 and S1 are combined by multiplexer (MUX) 314, which is driven by a clock signal CK7, which is twice the frequency of clock signals CK1-CK6. MUX 314 thus provides output data signal 316 for receiver 300. Output data signal 316 can take the form of a restored (non-degraded) pulse train.

Sampler S3 and S4 are clocked respective in-phase with samplers S1 and S2, and, thus, 180° apart in phase with respect to each other. The reference levels R3 and R4 differ respectively from the references levels R1 and R2 used by samplers S1 and S2 so that samplers S3 and S4 can be used for assessing the range of voltage and timing values for which receiver 300 accurately recovers data in the face of ISI and other types of noise as is known in the art. Outputs Q3 and Q4 of samplers S3 and S4, respectively, are combined using MUX 315 clocked by a clock CK8 at twice the frequency of clocks CK3 and CK4. Combined output 317 of MUX 315 is fed back to DFE 306 (via a node A). Output 317 is used to indicate whether to over-equalize and under-equalize via sampler inputs R1-R4.

Samplers S5 and S6 lag samplers S1 and S2 respectively by about 90° and are used for detecting zero crossings in amplified input signal 312 as is known in the art. The zero crossings can then be used for adjusting the timings (e.g., phases) of clocks CK1-CK4 and thus of samplers S1-S4.

Each sampler S1-S6 has a data input DI, a reference input REF, a clock input CK, and a data output DQ. Data inputs DI are coupled to front-end amplifier 302 for receiving fan outs of amplified input signal 312. Clock inputs CK are coupled to clock 308 for receiving clock signals CK1-CK6 respectively. Sampler outputs DQ output component data signals Q1-Q6 respectively.

Outputs DQ of samplers S1 and S2 are coupled to respective inputs IN1 and IN2 of MUX 314 for providing output signals Q1 and Q2 respectively thereto. MUX 314 has a clock input CK for receiving a clock signal CK7 from clock 308. Clock signal CK7 runs at twice the frequency of clocks CK1-CK6 and is used for merging the symbol outputs of samplers S1 and S2 to yield data output 316 at output DQ of MUX 314.

Parent sampler output 316 can be output to an analog-to-digital converter (ADC) for conversion to digital data. In addition, parent sampler output 316 is provided to an ADC of DFE 306 so that a number, e.g., of recent symbol decisions can be stored. DFE 306 applies an algorithm (which may be implemented entirely in hardware or defined in hardware by programming) that determines adjustments to reference signals. In general, a DFE can use a current data value or a value calculated based on a stored recent (continuous or discontinuous, e.g. with gaps) history of signal values.

DFE 306 outputs the results as equalizer signals EQ1-EQ4, which are provided to summers P1-P4. Summers P1 and P2 respectively sum equalization signals EQ1 and EQ2 with calibration signals CB1 and CB2 to yield reference signals R1 and R2 respectively. Summers P3 and P4 respectively sum equalization signals EQ3 and EQ4 with calibration signals CB3 and CB4 and with offset bias signals OB3 and OB4 to yield reference signals R3 and R4 respectively so that outputs Q3 and Q4 can be used for assessing the range of voltage and timing values for which receiver 300 accurately recovers data. Reference signals R1-R4 are input to the reference inputs REF of samplers S1-S4 respectively. For samplers S5 and S6, calibration signals CB5 and CB6 are input directly to the reference inputs REF of samplers S5 and S6 respectively.

Figure 4:
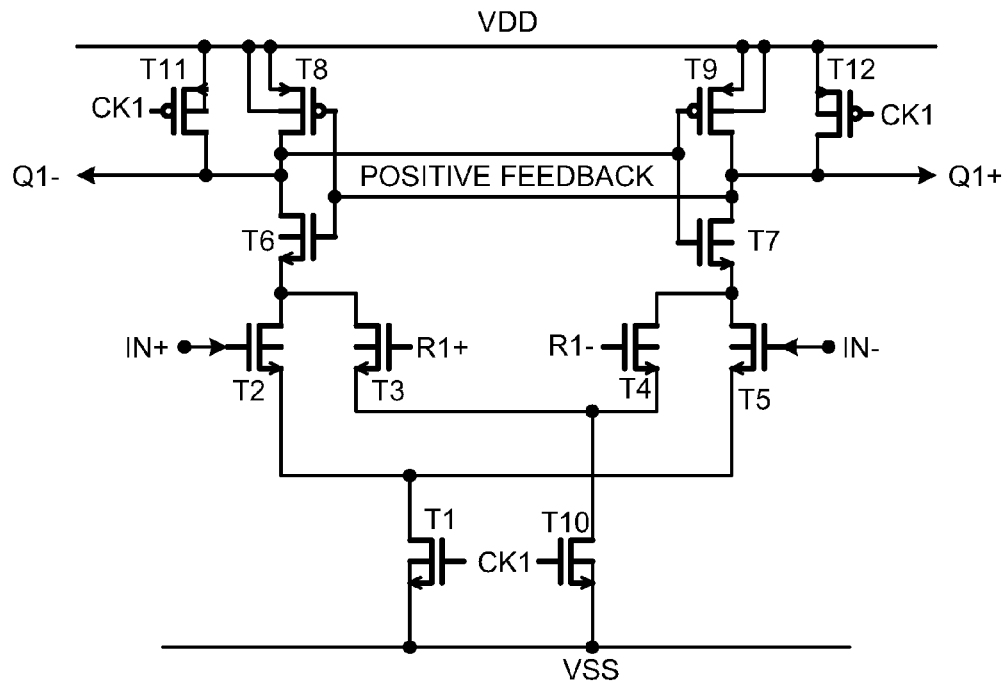
FIG. 4 is a circuit diagram of a portion of a sampler of the receiver system of FIG. 3.

A portion of sampler 51 is shown in FIG. 4 to convey a form that a sampler reference signal may take. The fan out of amplified input signal 312 provided to data input DI of sampler 51 is represented in FIG. 4 by differential signal pair IN+ and IN−. Reference signal R1 is represented by differential signal pair R1+ and R1−. Sampler output 316 is represented by differential signal pair Q1+ and Q1−. Clock CK1 represents itself. Voltage levels VDD and VSS are provided.

The operation of field-effect transistors T1-T12 is recognizable to those skilled in the art. Transistors T3 and T4 are arranged so that differential reference signals R1+ and R1− apply biases to differential input signals IN+ and IN−. Each differential bias signal R1+, R1−, results from a sum of a calibration signal and an equalization signal. In normal operation, the calibration signal (e.g., CB1) remains constant, while the equalization signal, (e.g., EQ1) varies dynamically according to the sampler data output.

Since the outputs of decision feedback equalizer 306 are not fed back to front-end amplifier 302 or anywhere else upstream of a sample data input, amplified input signal 312 is not affected by a signal output by DFE 306 while the sampler data output signal is affected by a signal output by DFE 306 In another example, the amplified input signal 312 is affected by a signal output by a decision feedback equalizer while a sampler data output signal is affected by a signal output by the decision feedback equalizer.

Figure 5:
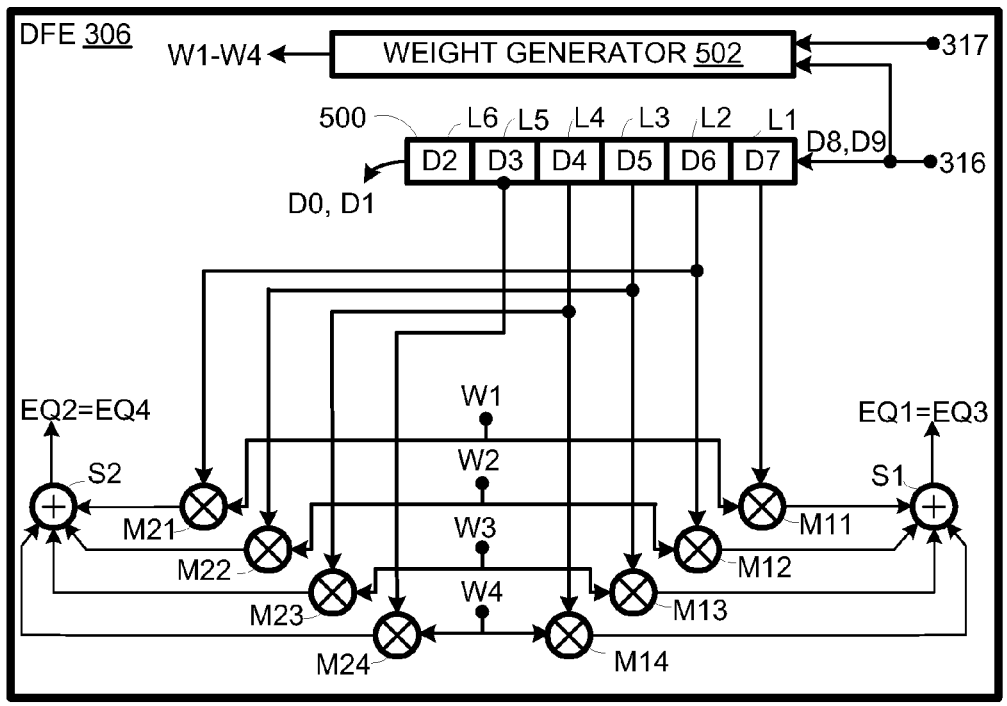
FIG. 5 is a schematic diagram of the decision-feedback equalizer of FIG. 3.

As shown in FIG. 5, DFE 306 includes a shift register 502. In this example, shift register 502 has locations L1-L6; other examples have shift registers with different numbers of locations, e.g., 16 locations. Sampler output 316 is input as a stream of decision symbols, e.g., D0-D9 in chronological order, to shift register 500. At the instant represented in FIG. 5, decision symbols D0 and D1 have just been discarded from shift register 500; decision symbols D7 to D2 respectively occupy locations L1-L6, and decision symbols D8 and D9 is positioned to enter shift register 500 in the next cycle.

Shift-register locations L1-L4 are respectively coupled to multipliers M11 to multipliers M11-M14, while shift register locations L2-L5 are respectively coupled to multipliers M21-M24. In some examples, all shift register locations are coupled to multipliers; however, in the example of FIG. 5, location L6 is not coupled to a multiplier. Each of multipliers M11-M14 and M21-M24 has two inputs: one for receiving a decision value from a respective shift-register location, and the other coupled for receiving a weighting coefficient or "weight", W1-W4, respectively. In other examples, there may be more shift register locations, more locations connected to multipliers, and more weight coefficients. For example, the number of weight coefficients and shift-register locations connected to multipliers can correspond to the cycle delay from the data bit to be processed.

The products output from multipliers M11-M14 are input to a summer S1 to yield DFE outputs EQ1 and EQ2, which are equal to each other. Typically, less recent symbol decisions are less significant in determining DFE outputs; accordingly, weights W1-W4 are in decreasing order, e.g., weight W12 is less than weight W11. Multipliers M21-M24 multiply the symbol decision values from shift-register locations L2-L5 with respective weighting coefficients W1-W4; the products are summed to yield DFE outputs EQ2 and EQ4, which are equal. In other examples, EQ3 may differ from EQ1 and EQ4 may differ from EQ2.

DFE 306 includes a weight generator 502 for generating and adjusting weights W1-W4 as a function of signal inputs 316 and 317 to maximize the range of voltage and timing values for which receiver 300 accurately recovers data in the face of ISI and other types of noise as is known in the art.

In FIG. 5, the values in L1 and L2 must be known before EQ1-EQ4 can be calculated. To minimize inter-symbol feedback latencies, the values for EQ1-EQ4 can be pre-calculated (e.g., using two multipliers corresponding to M11 and two summers corresponding to S1) for both (high and low) possible values for the values in shift register locations L1 and L2. Once the actual contents of these locations is known, they can be used to select (e.g., using a multiplexer) between the pre-calculated outputs.

Figure 6:
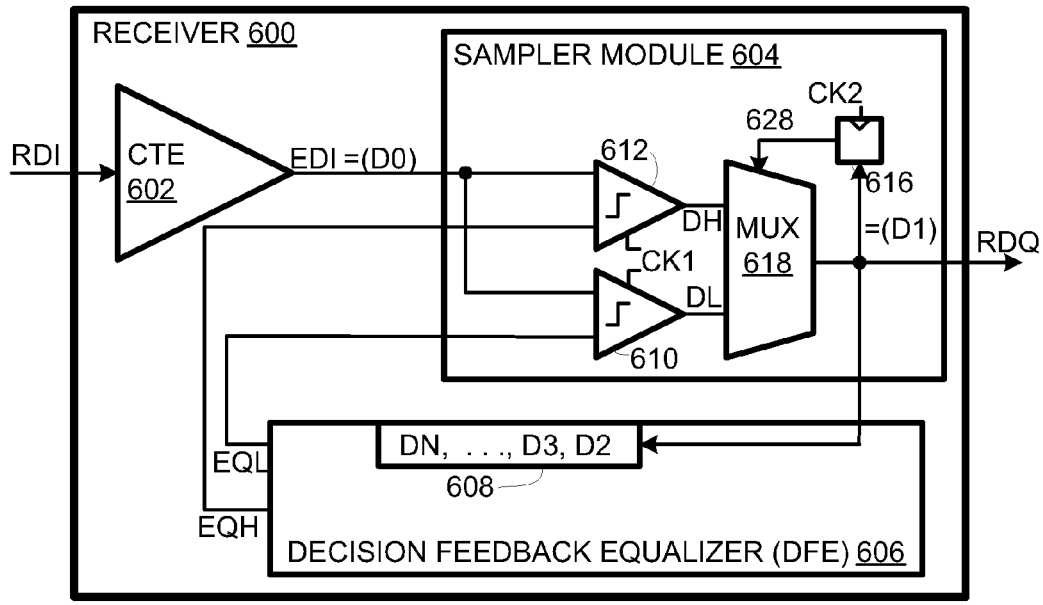
FIG. 6 is a schematic diagram of a receiver using assumed reference levels in accordance with an example.

Accordingly, a receiver 600 includes a continuous-time equalizer (CTE) 602, a sampler module 604, and a decision feedback equalizer 606. CTE 602, which can be a continuous-time linear equalizer (CTLE), equalizes and amplifies a receive data input signal RDI to yield an equalized data input signal EDI. At the instant represented in FIG. 6, equalized data input signal EDI represents a value for a data symbol D0, the value of which is to be ascertained by sampling signal EDI. The immediately prior data-symbol value D1 has not yet been stored in FIFO 608 of DFE 606.

DFE 606 generates and adjusts equalizer signals EQL and EQH based on data symbol values, e.g., D2-DN stored in FIFO 608. Equalizer signal EQH is generated based on an assumption that data symbol D1 is logic high, while equalizer signal EQL is generated based on an assumption that data symbol D1 is logic low.

Sampler module includes several samplers including samplers 610 and 612. Sampler 610 samples equalized data input signal EDI with respect to equalizer signal EQ1 to yield an "assumed" data symbol DL, which is thus generated under an assumption that D1 is logic low. Sampler 612 samples equalized data input signal EDI with respect to equalizer signal EQ2 to yield an "assumed" data symbol DH, which is thus generated under an assumption that D1 is logic low. The value of the immediately prior receiver data symbol (D1) is stored in a latch 616 so that it can control a multiplexer (MUX) 618. MUX 618 thus selects a "confirmed" one of assumed data signals DL and DH for inclusion in receiver output data-symbol sequence RDQ. Thus, inter-symbol feedback latencies are reduced and high data rates can be accommodated.

Figure 7:
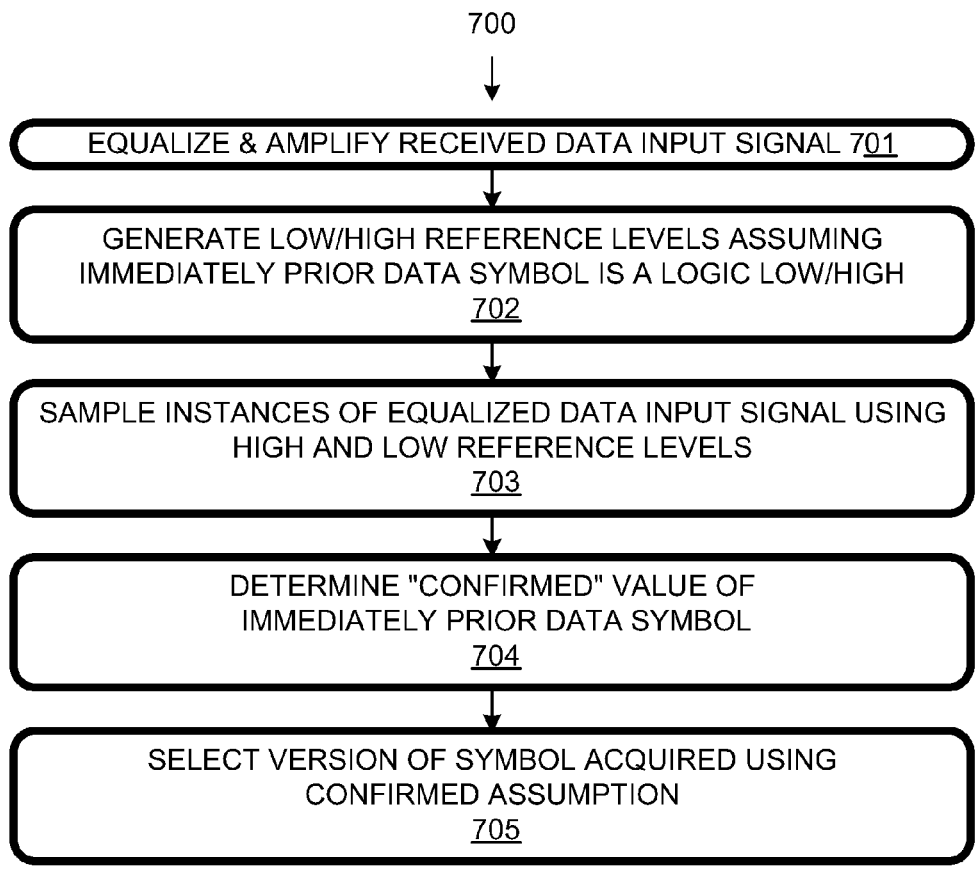
FIG. 7 is a process implementable by the receiver of FIG. 6 in accordance with an example.

A process 700, implementable by receiver 600, is flow charted in FIG. 7. At 701 a received data input signal, e.g., RDI, is equalized and amplified, e.g., by CTE 602 to yield an equalized data input signal. At 702, low and high reference levels are generated or adjusted based on conflicting assumptions that the value of the immediately prior data symbol is low or high. At 703, the equalized data input signal is sampled using the low and high reference levels to yield assumed logic low and assumed logic high data symbol values. The immediately prior data symbol is decided, it can be used to confirm one of the assumed data-symbol values at 704. The confirmed data-symbol value is selected for inclusion in the receiver data-symbol output sequence RDQ.

Another way to achieve higher data rates is to use different samplers for "odd" and "even" data symbols. Samplers are driven out-of-phase with respect to each other at half the data rate. This split-stream approach can be combined with the assumed data approach of FIGS. 6 and 7. In that case, separate multiplexers are used for selecting confirmed data symbols for the odd and even streams. The output of the "even" multiplexer can be used to control the timing of the "odd" multiplexer and vice versa.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation.

In this specification, related art is discussed for expository purposes. Related art labeled "prior art", if any, is admitted prior art. Related art not labeled "prior art" is not admitted prior art. In the claims, "said" indicates a claim element for which there is verbatim antecedent basis, while "the", if used, indicates a claim element for which the antecedent basis may be non-verbatim or implicit. The illustrated and other described embodiments, as well as modifications thereto and variations thereupon are within the scope of the following claims.

What is claimed is:

1. A receiver comprising:
   a front-end amplifier for amplifying a received input signal to yield an amplified input signal;
   a sampler module for sampling said amplified input signal so as to provide a sampler data output signal including a data-symbol sequence of data symbols having respective values, said sampler module having data inputs coupled to said front-end amplifier for receiving instances of said amplified input signal, said sampler module having voltage reference inputs for receiving voltage reference signals, said sampler data output signal being a function of said amplified input signal and said voltage reference signals; and
   a decision feedback equalizer for adjusting said reference signals at least in part as a function of said data-symbol sequence in that a first reference voltage used to sample a current data symbol of said data-symbol sequence is based in part on a value of an immediately prior data symbol in said data-symbol sequence.

2. A receiver as recited in claim 1 wherein, while said sampler data output signal is affected by a signal output by said decision feedback equalizer, said amplified input signal is not affected by a signal output by said decision feedback equalizer.

3. A receiver as recited in claim 1 wherein, while said sampler data output signal is affected by a signal output by said decision feedback equalizer, said amplified input signal is affected by a signal output by said decision feedback equalizer.

4. A receiver as recited in claim 1 wherein said sampler module is driven by a clock signal, the timing of which can be varied as a function of a signal output by said decision feedback equalizer.

5. A receiver as recited in claim 1. wherein said sampler module is a parent sampler having plural child samplers operating out-of-phase with respect to each other, said receiver further comprising a multiplexer for merging outputs of said child samplers to provide said sampler data output signal.

6. A receiver as claim 5 wherein said parent sampler has plural child zero-crossing samplers for sampling zero crossings of said amplified input signal for use in adjusting clock timing.

7. A receiver as recited in claim 5 wherein said parent sampler has plural child samplers for assessing a range of voltage and timing values for which said receiver accurately recovers data.

8. A receiver as recited in claim 1 wherein said reference signal is a differential signal.

9. A receiver as recited in claim 1 wherein said decision feedback equalizer adjusts said reference signal using an equalization signal output from said decision feedback equalizer.

10. A receiver as recited in claim 9 further comprising a signal combiner for combining said equalization signal with a calibration signal to yield said reference signal.

11. A receiver process comprising:
    amplifying an information-bearing received signal to yield an amplified input signal;
    sampling said amplified input signal using a sampler module to yield a sampler data output signal including a data-symbol sequence of data symbols that is a function of said amplified input signal and sampler reference voltages provided to said sampler module; and adjusting said sampler reference voltages as a function of feedback based on said sampler data output signal so that a reference voltage used to determine a value of a data symbol of said data-symbol sequence is based in part on a value of an immediately prior data symbol in said data-symbol sequence.

12. A receiver process as recited in claim 11 further comprising receiving said information-bearing received signal.

13. A receiver process as recited in claim 11 further comprising multiplexing plural component data output signals to yield said sampler data output signal, said plural component data output signals being produced using samplers of said sampler module sampling said amplified input signal and operating out-of-phase with respect to each other.

14. A receiver process as recited in claim 11 wherein said amplified input signal is not affected by feedback from said sampler data output signal.

15. A receiver process as recited in claim 11 wherein said adjusting is accomplished in part using a decision-feedback equalizer coupled to said sampler for receiving said sampler output signal.

16. A receiver process as recited in claim 11 wherein said adjusting includes adjusting a first reference voltage provided to a first sampler and adjusting a second reference voltage provided to a second sampler, said sampling including selecting between an output of said first sampler and an output of said second sampler as a source of said current data symbol based on the value of the immediately prior data symbol.

17. A receiver process as recited in claim 16 wherein said first reference voltage corresponds to an assumption that the value of the immediately prior data symbol is logic high and said second reference voltage corresponds to an assumption that the value of the immediately prior data symbol is logic low.

18. A receiver as recited in claim 1 wherein said sampler module includes first and second samplers and a multiplexer, said multiplexer being controlled so that it selects between said first and second samplers as a source for a current data symbol of said data-symbol sequence based on a value of an immediately preceding data symbol of said data-symbol sequence.

19. A receiver as recited in claim 18 wherein said decision feedback equalizer provides a second reference voltage to said first sampler and a third reference voltage to said second sampler, said first reference voltage being, at any given time, the same as a selected one of said second or third reference voltages.

20. A receiver as recited in claim 19 wherein said second reference voltage corresponds to an assumption that said immediately prior data symbol is a logic high and said third reference voltage corresponds to an assumption that said immediately prior data symbol is a logic low.

* * * * *